US012370579B2

(12) United States Patent
Merritt et al.

(10) Patent No.: US 12,370,579 B2
(45) Date of Patent: Jul. 29, 2025

(54) SELF CLEANING APPARATUS AND METHOD

(71) Applicant: ILLINOIS TOOL WORKS INC., Glenview, IL (US)

(72) Inventors: Brian Merritt, Easley, SC (US); Brett Stripe, Piedmont, SC (US); Charles Bryan Shiflet, Greenville, SC (US); Robert C. Beesley, Greenville, SC (US); J. Mark Nunn, Simpsonville, SC (US)

(73) Assignee: ILLINOIS TOOL WORKS INC., Glenview, IL (US)

(*) Notice: Subject to any disclaimer, the term of this patent is extended or adjusted under 35 U.S.C. 154(b) by 1021 days.

(21) Appl. No.: 17/235,354

(22) Filed: Apr. 20, 2021

(65) Prior Publication Data

US 2021/0237127 A1 Aug. 5, 2021

Related U.S. Application Data

(63) Continuation-in-part of application No. 16/105,438, filed on Aug. 20, 2018, now Pat. No. 10,983,335.

(60) Provisional application No. 63/077,640, filed on Sep. 13, 2020, provisional application No. 62/599,879, filed on Dec. 18, 2017.

(51) Int. Cl.
*B08B 5/02* (2006.01)

(52) U.S. Cl.
CPC .................................... *B08B 5/02* (2013.01)

(58) Field of Classification Search
CPC ....................................................... B08B 5/02
See application file for complete search history.

(56) References Cited

U.S. PATENT DOCUMENTS

| | | | | |
|---|---|---|---|---|
| 4,561,732 | A | | 12/1985 | Japes |
| 4,611,814 | A | * | 9/1986 | Hiestand .............. B23B 31/001 279/123 |
| 5,812,314 | A | | 9/1998 | Kuriaki et al. |
| 5,848,706 | A | * | 12/1998 | Harris .................... B07C 5/366 209/580 |
| 6,290,361 | B1 | | 9/2001 | Berzin |
| 8,282,377 | B2 | | 10/2012 | Higashi et al. |
| 2002/0005440 | A1 | | 1/2002 | Holt et al. |
| 2003/0155001 | A1 | | 8/2003 | Hoetzer et al. |

(Continued)

FOREIGN PATENT DOCUMENTS

| | | | | |
|---|---|---|---|---|
| JP | 2002036040 | A | * | 2/2002 |
| JP | 2014050934 | A | * | 3/2014 |

OTHER PUBLICATIONS

Machine translation: JP-2002036040-A; Yahgagi, Y. (Year: 2002).*

(Continued)

*Primary Examiner* — Natasha N Campbell
(74) *Attorney, Agent, or Firm* — Pauley Erickson & Swanson

(57) ABSTRACT

An apparatus for self-cleaning of a component in a machine, which includes at least one air nozzle disposed in air discharge communication with a surface of the component to be cleaned, such as a sensor surface or a gripper surface. The air nozzle is in air flow communication with air exhaust from an air cylinder of the component or a second component of the machine. Related, corresponding, or associated methods for self-cleaning the component in a machine are also disclosed.

14 Claims, 6 Drawing Sheets

(56) References Cited

U.S. PATENT DOCUMENTS

| | | | |
|---|---|---|---|
| 2003/0197909 A1 | 10/2003 | Beyer et al. | |
| 2004/0200027 A1 | 10/2004 | Sugihara | |
| 2005/0206511 A1 | 9/2005 | Heenan et al. | |
| 2007/0084763 A1 | 4/2007 | Stephenson et al. | |
| 2007/0261711 A1 | 11/2007 | Fagrenius et al. | |
| 2009/0231707 A1 | 9/2009 | Ehm et al. | |
| 2011/0073142 A1 | 3/2011 | Hattori et al. | |
| 2011/0266375 A1 | 11/2011 | Ono et al. | |
| 2012/0117745 A1 | 5/2012 | Hattori et al. | |
| 2012/0243093 A1 | 9/2012 | Tonar et al. | |
| 2013/0219742 A1 | 8/2013 | Field et al. | |
| 2013/0258472 A1 | 10/2013 | Ritzl | |
| 2014/0104426 A1 | 4/2014 | Boegel et al. | |
| 2015/0151722 A1 | 6/2015 | Gokan et al. | |
| 2015/0183406 A1 | 7/2015 | Tanaka et al. | |
| 2015/0277111 A1 | 10/2015 | Bell et al. | |
| 2015/0296108 A1 | 10/2015 | Hayakawa et al. | |
| 2015/0353024 A1 | 12/2015 | Cooper | |
| 2016/0272164 A1 | 9/2016 | Hsiao et al. | |
| 2016/0325715 A1 | 11/2016 | Niemczyk | |
| 2017/0008155 A1* | 1/2017 | Hanlon | B25B 1/2489 |
| 2018/0251100 A1 | 9/2018 | Mitsunari et al. | |
| 2019/0187462 A1 | 6/2019 | Beesley et al. | |

OTHER PUBLICATIONS

Machine translation: JP-2014050934-A; Kawakami, T. (Year: 2014).* http://machinedesign.com/print/pneumatics/basics-pneumatic-control-values, Parker Hannifin Corporation, "machine design," Aug. 8, 2002, Richland, Michigan, retrieved Apr. 8, 2016 (2 pages).

* cited by examiner

SELF CLEANING APPARATUS AND METHOD

CROSS REFERENCE TO RELATED APPLICATION

This application is a continuation-in-part application of U.S. patent application Ser. No. 16/105,438, filed on 20 Aug. 2018, which claims the benefit of U.S. Provisional Application, Ser. No. 62/599,879, filed on 18 Dec. 2017. This application also claims the benefit of U.S. Provisional Application, Ser. No. 63/077,640, filed on 13 Sep. 2020. The applications are hereby incorporated by reference herein in their entirety and are made a part hereof, including but not limited to those portions which specifically appear hereinafter.

BACKGROUND OF THE INVENTION

Field of the Invention

This invention relates generally to manufacture, process and product conveyance systems and, more particularly, to an apparatus and method for self-cleaning components of such systems.

Description of Prior Art

Product or package processing typically produces dust, corrugate, and/or other particulate formation. Accumulation of such dust corrugate, or particulate material on the surfaces of functional components can degrade or otherwise act to reduce the ability of the components to function accurately and properly.

As an example, photo eye sensors are commonly utilized in a wide variety of manufacture, process and product conveyance systems. For example, photo eyes are commonly employed in or with packaging equipment to sense product position and flow. Photo eye sensors are typically placed throughout or about packaging machines as required for desired monitoring of processing. Accumulation of such condensation, dust and particulate material on the lens of the photo eye sensor can degrade or otherwise act to reduce the ability of the sensor to function accurately and properly. Thus, it can be important that the lens of the photo eye be kept clean and free of particulate. This is also true for the reflective surface of an associated or corresponding reflector, if present.

Photo eye sensors can be located anywhere in or about a manufacture, process or product conveyance machine. As will be appreciated, photo eye sensors may be strategically positioned or placed in locations that are generally not easily accessible for cleaning. That is, the placement, positioning or locating of the photo eye sensor may be such that cleaning of sensor by an operator may be difficult or at best, inconvenient. For example, a photo eye sensor may be or not be readily accessible or may require the discontinuation or stopping of operation to permit accessing.

Therefore, there exists a need for an apparatus and method for facilitating the desired cleaning of photo eye sensors and related devices, such as reflectors or reflective surfaces commonly used in conjunction with such sensors.

As another example, grippers, such as including two pneumatic jaws, are commonly utilized in a wide variety of manufacture, process and/or product conveyance systems. For example, tier sheet grippers are used in automated depalletizing systems to automatically insert empty or full containers from a pallet to a conveyor system to be filled or processed in an automated or semi-automated packaging line. Accumulation of such dust corrugate, or particulate material on the surface of the gripper jaws can degrade or otherwise act to reduce the ability of the gripper to function accurately and properly. Thus, it can be important that the gripping surface be kept clean and free of particulate.

As will be appreciated, gripper surfaces may be difficult to clean when in operation. Therefore, there exists a need for an apparatus and method for facilitating the desired cleaning of grippers and related devices, such as automatically or periodically during operation.

SUMMARY OF THE INVENTION

The present invention is directed to an apparatus and method for self-cleaning components in manufacturing or processing equipment, such photo eyes sensors, grippers and/or related or other functional devices.

In accordance with one aspect of the subject development, there is provided an apparatus for self-cleaning such photo eyes sensors and/or grippers in a machine operations environment.

In one preferred embodiment, such an apparatus includes at least one air nozzle disposed in air discharge communication with a surface to be cleaned of a component, with the at least one air nozzle in air flow communication with air exhaust from an air cylinder of the machine, such as for the component or a second component of the machine. The air exhaust desirably can be waste air generated directly from the machine, and wherein the air exhaust enters a tube from the first component or a second component of the machine to discharge the waste air at the nozzle(s) adjacent the surface to be cleaned.

An apparatus for component self-cleaning in a machine in accordance with one preferred embodiment includes a plurality of air nozzles each in air discharge communication with the component and in air flow communication with air exhaust from a single air cylinder of the component or a second component of the machine.

In one preferred embodiment, such an apparatus includes at least one air nozzle disposed in air discharge communication with a surface to be cleaned of a photo eye sensor, with the at least one air nozzle in air flow communication with air exhaust from an air cylinder of a component of the machine. An apparatus for photo eye sensor self-cleaning in a machine in accordance with another preferred embodiment includes a plurality of air nozzles each in air discharge communication with a photo eye sensor surface to be cleaned. In such an apparatus, each of the plurality of air nozzles can desirably be in air flow communication with air exhaust from a single air cylinder of a functional component of the machine.

In another presently preferred embodiment, the apparatus is for self-cleaning of a gripper. The apparatus includes an air nozzle disposed in air discharge communication with a gripper jaw surface to be cleaned, the at least one air nozzle preferably in air flow communication with air exhaust from an air cylinder component for actuating the gripper. The nozzle can be oriented from a direction relative to a grip surface (above, below, to the side, etc.), and desirably the air nozzle extends into and/or through the gripper jaw to discharge air through and out a discharge opening in a textured grip surface to be cleaned.

In accordance with another aspect of the subject development, methods for self-cleaning a component, such as a sensor or a gripper, in a machine are provided.

In one preferred embodiment, one such method involves conveying exhaust air from an air cylinder of a component of the machine to the surface to be cleaned and then applying the exhaust air onto the surface to remove debris from the surface. As used herein, references to the removal of "debris" from a component surface are to be understood to refer to the removal of condensation, dust, particulate matter and/or the like from the referenced surface of the photo eye sensor or gripper, etc.

Further, references to a photo eye sensor or gripper "surface" are to be understood as generally referring to an operational face or portion of the component, such as an eye sensor lens or associated reflector or reflective surface.

BRIEF DESCRIPTION OF THE DRAWINGS

The above-mentioned and other features and objects of this invention will be better understood from the following detailed description taken in conjunction with the drawings wherein.

DESCRIPTION OF PREFERRED EMBODIMENTS

Figure 1:
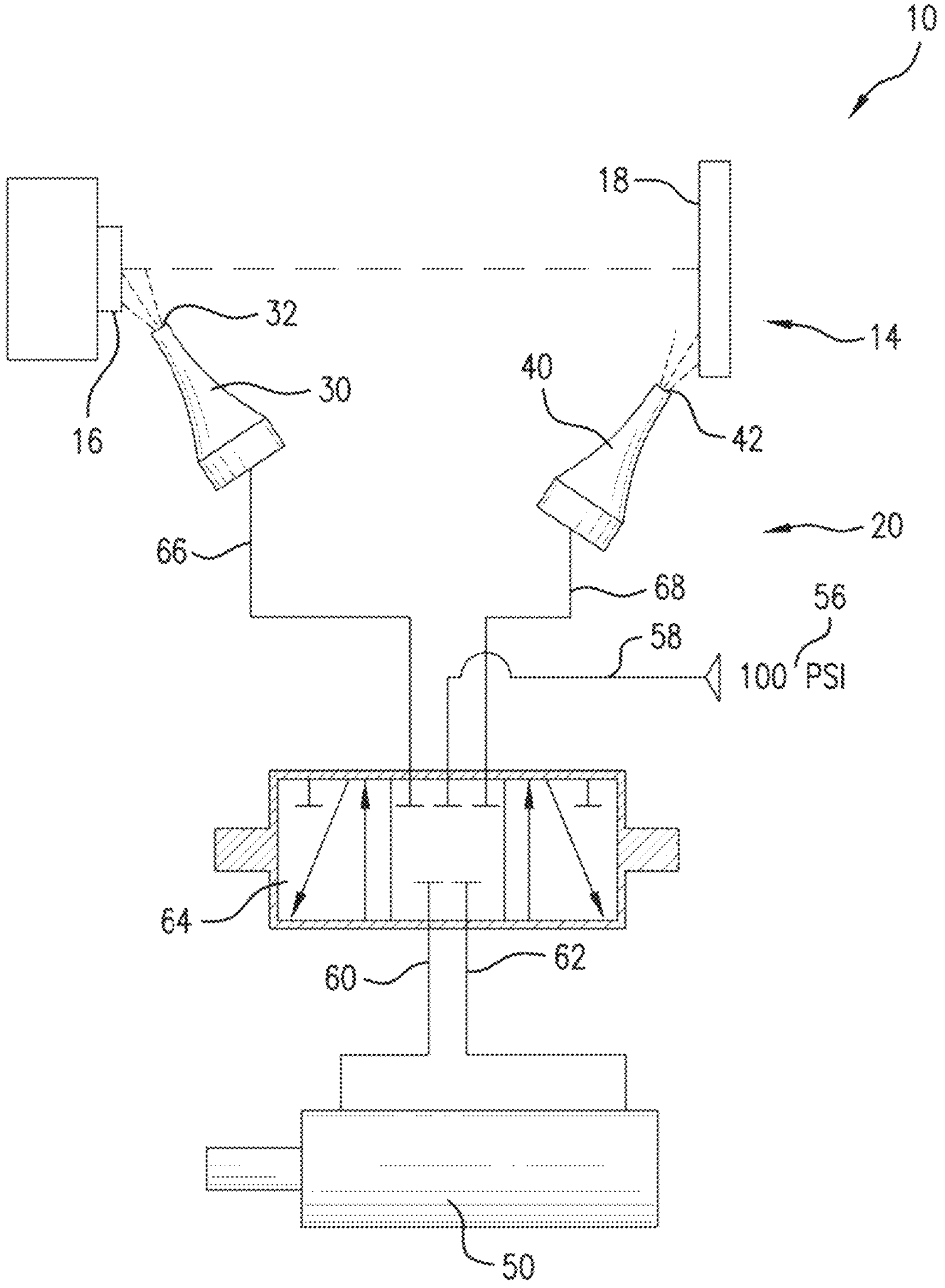
FIG. 1 is a simplified schematic of an apparatus according to one preferred embodiment of the invention.

FIG. 1 is a simplified schematic of an assembly, generally designated by the reference numeral 10. The assembly 10 includes a photo eye sensor arrangement 14 such as commonly employed in a variety of manufacture, process and product conveyance applications. The photo eye sensor arrangement 14 includes first and second photo eye sensor components 16 and 18 such as composed of a photo eye lens and an associated or corresponding reflector, for example.

As detailed further below, the assembly 10 also includes or incorporates an apparatus, according to one preferred embodiment of the invention and generally designated by the reference numeral 20, for the self-cleaning of a photo eye sensor. The apparatus 20 includes a first air nozzle 30 having a discharge opening 32 directed to or at the first photo sensor component 16 and, more particularly, the active or functioning surface thereof, e.g., the photo eye lens. The apparatus 20 further includes a second air nozzle 40 having a discharge opening 42 directed to or at the second photo sensor component 18 and, more particularly, the active or functioning surface thereof, e.g., the reflecting surface of the reflector associated or corresponding to the photo eye lens.

The extent and duration of the discharge or application of the air from the nozzles in accordance with a preferred embodiment of the invention onto the active or functioning surface of the respective photo sensor component are desirably sufficient to dislodge, displace or otherwise effectively move debris that may have formed, collected or otherwise gathered onto the photo sensor component surface, such as during placement and operation of the photo eye sensor arrangement in a manufacture, process and product conveyance applications, for example. As a result of effective movement or removal of such debris, the operational functioning of the photo eye sensor arrangement can be significantly enhanced. Moreover, the incorporation and utilization of such an apparatus for the self-cleaning of photo eye sensor components better permits or allows the placement or location of such photo eye sensor components in placements or locations not normally easily accessible for cleaning or in placements or locations inaccessible to an operator.

As shown, the air nozzles 30 and 40 are each appropriately joined or connected in air flow communication with an air source 50 such as an air cylinder of a component of the machine in or on which the photo eye sensor is located or disposed and such as commonly located and/or found in, by or with manufacture, process and product conveyance application environments. As will be appreciated by those skilled in the art and guided by the teaching herein provided, suitable such air source actuator cylinders can suitably be from any equipment or piece of equipment such as to permit the efficient use of exhaust air or what normally might be otherwise be deemed waste air in a useful and productive manner. For example, air source actuator cylinders find wide application and utilization in mechanical devices and related components which use the power of compressed gas to produce a force in a reciprocating motion.

To that end, a supply 56 of such exhaust air, such as from a component of the subject machine, is shown joined or connected in air flow communication with the air cylinder 50 such as via tubing or piping conduits 58, 60 and 62 and a solenoid valve 64.

As further shown, the air cylinder 50 is joined or connected in air flow communication with the air nozzles 30 and 32 via the tubing or piping conduits 60 and 62, the solenoid valve 64 and the tubing or piping conduits 66 and 68.

In accordance with a preferred embodiment, air exhausted from a component of the machine, particularly a component or operation at, near or adjacent the vicinity of or to the respective photo eye sensor arrangement, is utilized for this purpose.

Figure 2:
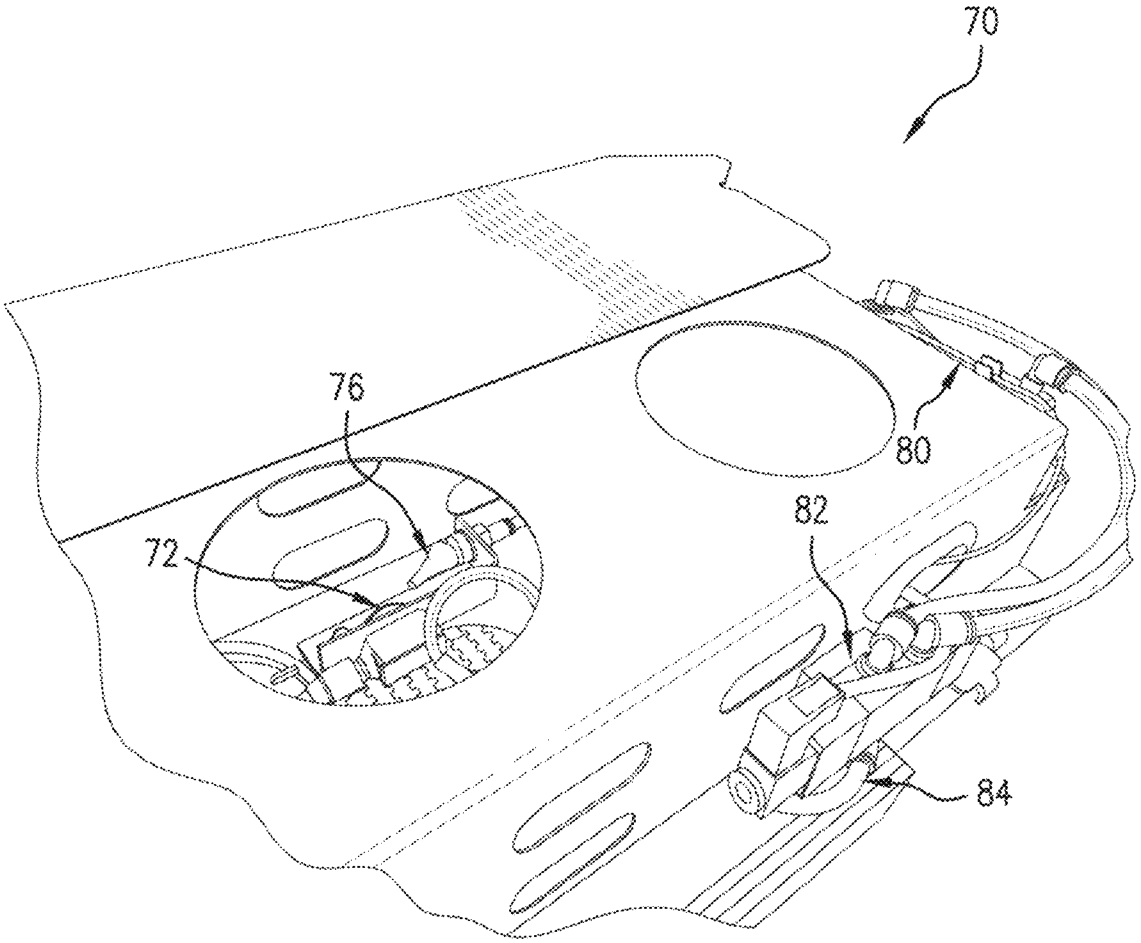
FIG. 2 is a side perspective view of a portion of a processing unit incorporating an apparatus according to one preferred embodiment of the invention.

To that end, FIG. 2 illustrates a portion of a processing unit 70 incorporating an apparatus for self-cleaning of a photo eye sensor in accordance with one preferred embodiment of the invention.

A photo eye lens 72 is shown in an interior, not readily accessible, location in the processing unit 70. An air nozzle 76, such as herein described and provided in the subject invention, is shown in air discharge communication with the photo eye lens 72. An air cylinder 80 is joined or connected to a valve 82 to operate and connect in air flow communication the air cylinder 80 such that exhaust air is directed to the air nozzle 76, such as via the tubing 84.

Figure 3:
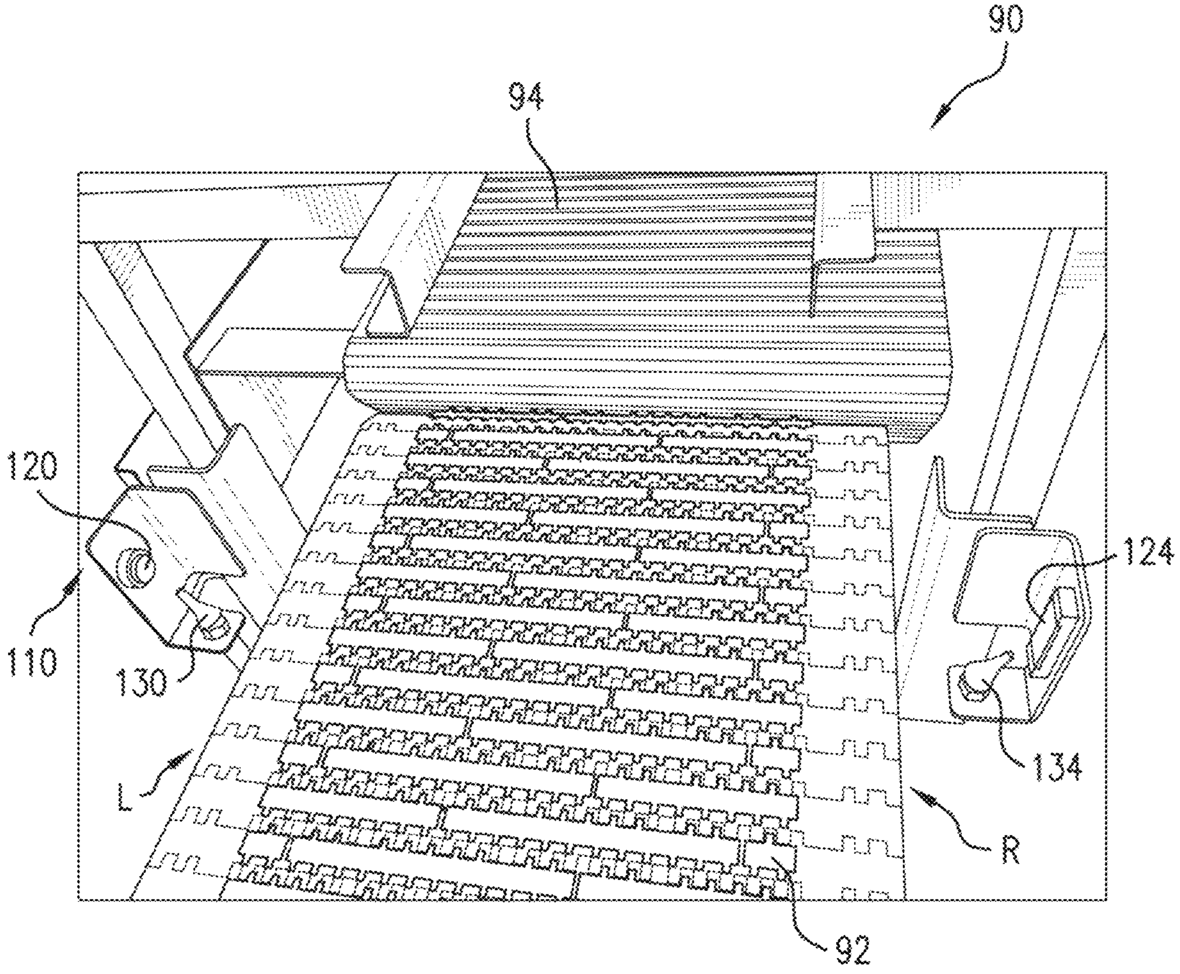
FIG. 3 is a perspective view of a portion of a processing unit incorporating an apparatus according to one preferred embodiment of the invention.

FIG. 3 is a perspective view of a portion of a processing unit 90 incorporating an apparatus for self-cleaning of a photo eye sensor in accordance with one preferred embodiment of the invention.

The processing unit 90 includes a first and second conveyors 92 and 94, shown in end to end adjacent alignment. The processing unit 90 includes a photo eye sensor arrangement 110 such as positioned at or about the first conveyor 92, near the junction with the second conveyor 94 such as to permit monitoring of products or other objects being transported or conveyed therebetween, for example. The exemplary photo eye sensor arrangement 110 includes a photo eye lens 120 positioned on a first side L of the first conveyor 92 and a corresponding of associated reflector 124 positioned on the opposite side R of the first conveyor 92.

As shown, a first air nozzle 130 is positioned or placed so as to be in air discharge communication with the photo eye lens 120. Similarly, a second air nozzle 134 is positioned or placed so as to be in air discharge communication with the active or functioning surface of the reflector 124.

Though not specifically shown in FIG. 3, the air nozzles 130 and 134 are each appropriately joined or connected to a source of exhaust air from machine operations, such as described above.

As will be appreciated by those skilled in the art and guided by the teachings herein provided, in the practice of the subject development air discharge from a nozzle may, for example, be done continuously, periodically such as at selected time intervals, or on demand as may be desired for particular or specific applications.

Moreover, while some of the figures show air nozzles associated with both a photo eye lens component and a photo eye reflector, the broader practice of the invention is not necessarily so limited. For example, if desired, the invention can be practiced utilizing an air nozzle such as herein described in conjunction with only one of such components where such application might be more appropriate.

Furthermore, it is to be understood and appreciated that, two or more air nozzles such as herein described can, if desired, be directed to or at a single photo eye sensor component in a particular application. The utilization of such multiple air nozzles may be desired such as to provide air discharges from different angles or at different points in time, for example.

Embodiments of the present invention are directed to an apparatus and method to automatically clean a surface of a gripper, such as a depalletizing tier sheet gripper, using pneumatic air to force material buildup such as dust, corrugate or other particulates, off the surface of the jaws (e.g., a serrated jaw surface) of the grippers. The prevention of material buildup on the gripper jaws allows the mechanism to continue to operate as desired without the need of downtime to manually clean. If cleaning is not performed, the grippers may not function properly causing downtime on an automated or semi-automated production line.

A pneumatic cylinder is typically used to open and close tier sheet gripper jaws during an automated depalletizing cycle. On most depalletizing systems, this pneumatic air is typically exhausted to atmosphere through an electronically controlled solenoid valve (See FIG. 10). In embodiments of this invention, the exhausted air is routed through the gripper jaws and out the face of the grip surface (e.g., the serrated teeth). The air exhausting out in this path provides a force to push any dust, corrugate, or other particulates off the surface of the grip surface and allowing the gripper to continue proper operation. In this way, the invention utilizes green energy by not requiring the use of any additional energy to perform its function.

Figure 4:
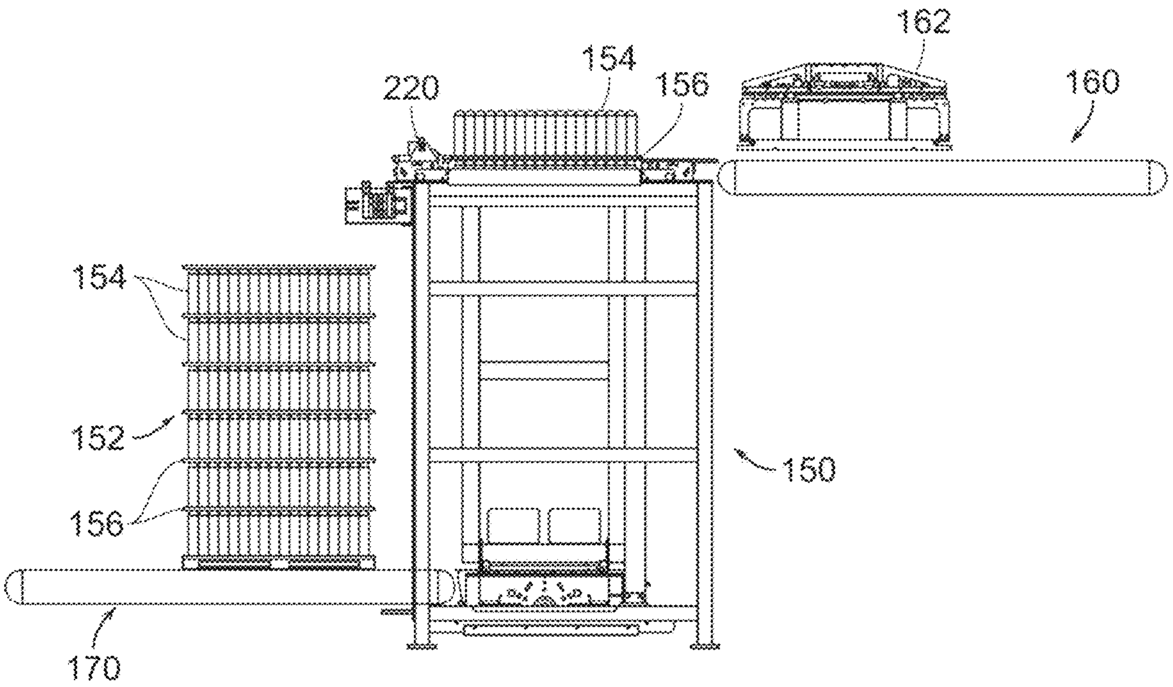
FIGS. 4 and 5 show an exemplary automated container depalletizer, according to embodiments of this invention.
Figure 5:
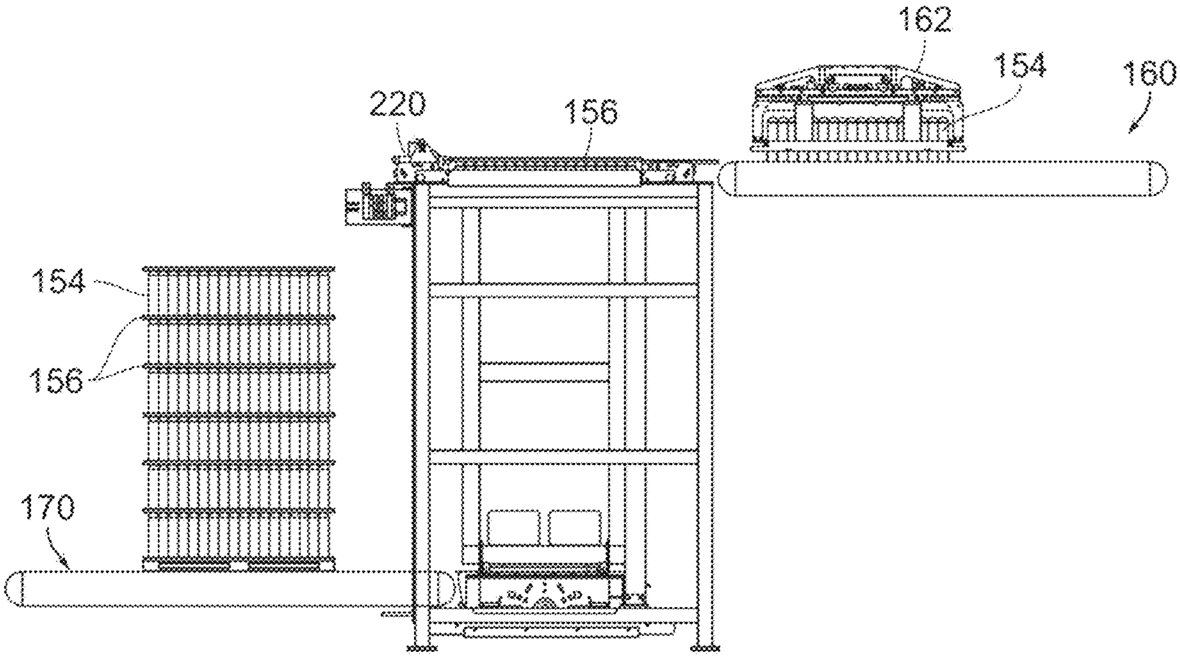

FIGS. 4 and 5 show an exemplary automated container depalletizer 150, such as used to automatically insert empty or full containers 154 from a pallet 152 to a conveyor system 160 to be filled or processed in an automated or semi-automated packaging line. The containers 154 are typically separated in multiple layers or tiers on the pallet 152. In-between each layer of containers 154 is a tier sheet 156. The automated depalletizer 150 will typically accept a full pallet of containers 154 from a low-level infeed conveyor system 170. The automated depalletizer 150 will then use an elevator or hoist mechanism to elevate the top tier of containers 154 to an outfeed conveyor elevation. A mechanical device referred to as a depalletizing sweep mechanism 162 will then push the top tier of containers 154 off the tier sheet 156 and onto the outfeed conveyor system 160. Multiple tier sheet grippers 220 are used to hold the tier sheet 156 in place while the depalletizing sweep mechanism 162 is pushing the containers 154 onto the outfeed conveyor 160 as shown in FIG. 5. The depalletizing sweep mechanism 162 will then remove the now empty tier 156 sheet and place in a separate storage container to be removed from the automated depalletizer 150. The elevator or hoist will index up to the next tier of empty containers 154. This process will repeat until all the tiers of containers 154 have been pushed onto the outfeed conveyor 160 by the depalletizing sweep mechanism 162.

Figure 6:
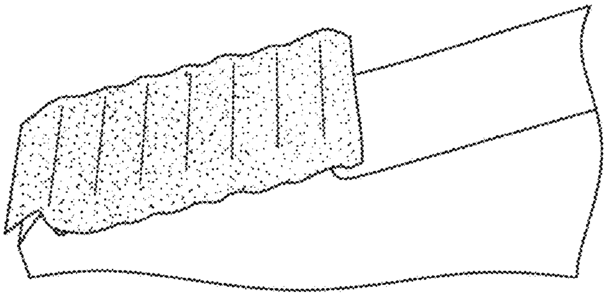
FIG. 6 shows an exemplary grip surface with contaminant buildup.

Keeping the tier sheets from entering the outfeed conveyor system is important for the performance of the outfeed conveyor systems. Over time, it is possible for the sheet grippers to have buildup of material waste, often from the tier sheets themselves. This is more likely to occur when the tier sheets are made of a corrugated, chipboard or other paper product. This buildup of material on the tier sheet gripper jaw surface can reduce gripping performance and prevent proper holding of the tier sheet while the depalletizing sweep mechanism pushes the tier of containers to the outfeed conveyor. If the tier sheet comes out of the grippers during this cycle, the tier sheet will cause downtime of the conveyor system or other downstream equipment. FIG. 6 shows an example of what this material build-up can look like. This material build-up is often cleaned by an operator while the machine is not running for typical automated depalletizing systems.

Figure 7:
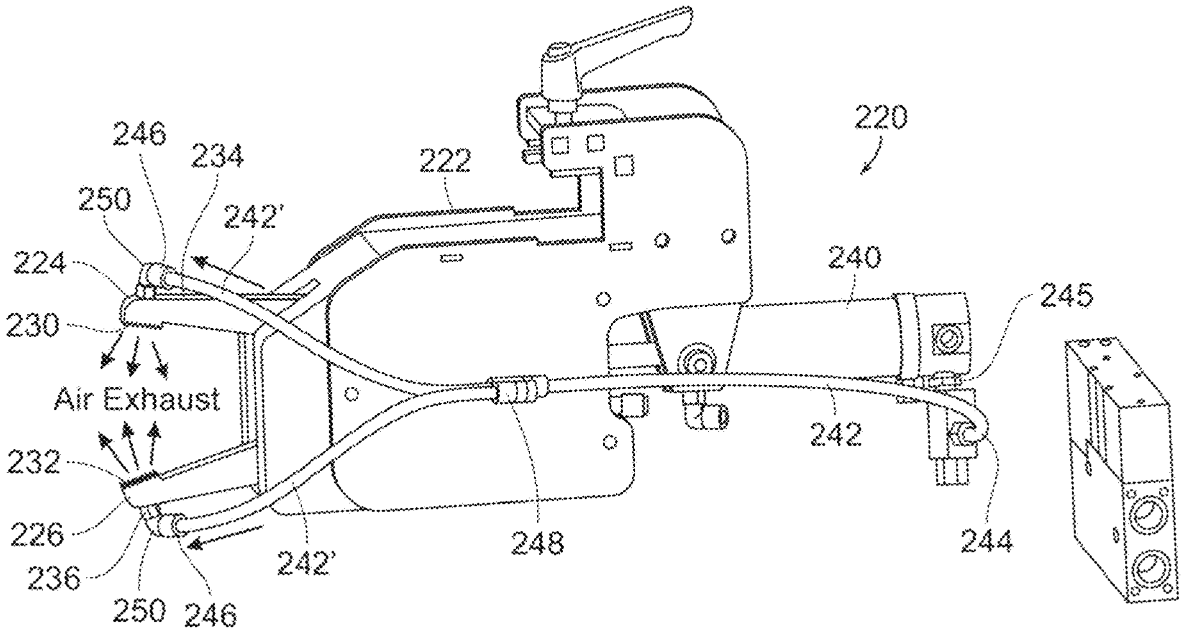
FIGS. 7 and 8 show a self-cleaning gripper, according to one preferred embodiment of the invention.
Figure 8:
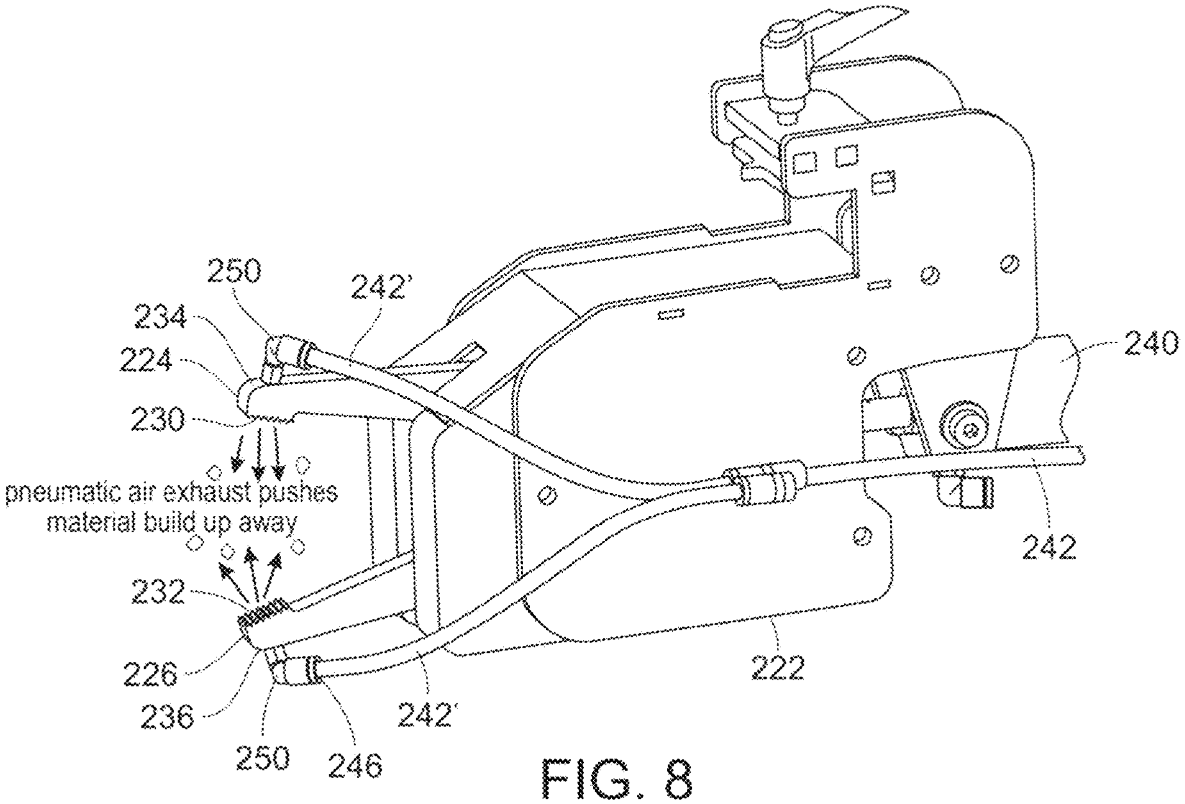

FIGS. 7 and 8 show a self-cleaning gripper 220 according to one embodiment of this invention. The gripper 220 includes a gripper body 222 supporting two opposing gripper jaws 224 and 226. Each of jaws 224 and 226 includes a grip surface 230 and 232, and an opposing backside 234 and 236, respectively. Each grip surface 230 and 232 is preferably textured, such as by a serrated surface for improved gripping.

Figure 9:
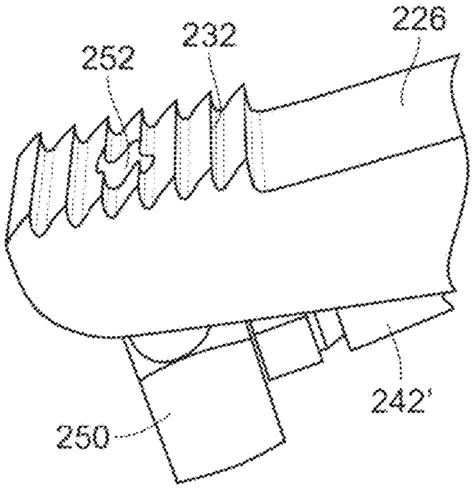
FIG. 9 shows a grip surface air discharge opening, according to one preferred embodiment of the invention.

The gripper 220 includes a pneumatic cylinder 240 or equivalent for operating the jaws 224 and 226 to grip and release an item such as a tier sheet discussed above. An air line 242 is connected at a first end 244 to a cylinder exhaust 245. The air line 242 is connected at one or more second ends 246 to the backsides 234, 236 of one or more of the gripper jaws 224, 226. As illustrated, the air line 242 is divided into two lines 242' at splitter 248, and each of the divided lines 242' is connected to a corresponding backside 234 and 236 of the jaws 224 and 226 by a nozzle attachment 250. As shown in FIG. 9, each grip surface 230 and 232 includes one or more air discharge openings 252 to direct the exhaust air up under any debris on the grip surfaces 230 and 232.

FIGS. 7 and 8 show the path of exhausted air (arrows) in this invention during each automated cycle. Exhausted air is routed through the gripper jaws 224 and 226 and out the face of the serrated teeth 230 and 232. This path of air provides the required force to push material away from the jaw keeping the surface clean from buildup.

Figure 10:
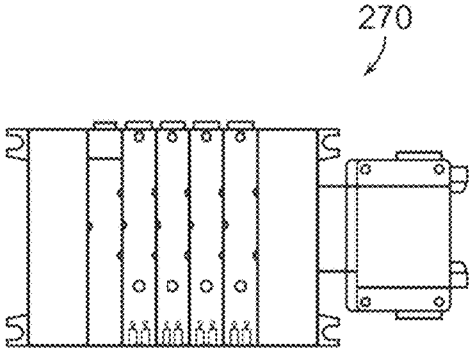
FIG. 10 shows a solenoid valve for a gripper, according to one preferred embodiment of the invention.

The tier sheet gripper can include an electronically controlled solenoid valve 270 such as shown in FIG. 10 to deliver the proper pneumatic pressure to operate a pneumatic cylinder. This cylinder is used to open and close the mechanical gripping jaws that will hold the tier sheet in place on the automated depalletizing system.

Pneumatic air provided to most automated equipment in a production line is produced from a centralized air compressor. A compressor will use electrical energy to store air pressure to be used for multiple automated equipment. There is a desire to keep cost down by using as little energy as possible to produce this stored air pressure. Embodiments of this invention can be operated as shown without any additional air compressor, and thus energy, than what is already being used to operate the automatic depalletizing system.

As mentioned above, air discharge from a nozzle may, for example, be done continuously (each cycle), periodically such as at selected time intervals, or on demand as may be desired for particular or specific applications. Suitable valves and controllers can be used to control the air discharge from the nozzle(s).

Moreover, while the figures show air nozzles associated through the gripper jaws, the broader practice of the invention is not necessarily so limited. For example, if desired, the invention can be practiced utilizing an air nozzle directed from a side and/or down a length of the gripper jaws.

Furthermore, it is to be understood and appreciated that two or more air nozzles such as herein described can, if desired, be directed to or through one gripper jaw in a particular application. Likewise the gripper jaws can be formed with more than one air opening, such as by more than one nozzle or an internal passage manifold connecting one nozzle inlet to multiple grip surface openings. The utilization of multiple air nozzles/openings may be desired such as to provide air discharges from different points or angles, for example.

While the broader practice of the invention in not necessarily limited by or to use or practice in specific or particular manufacturing, processing or product conveying applications, in accordance with one aspect of the invention, the invention finds desirable application in packaging processing such as where the air exhaust employed in the subject apparatus results from or is produced by a component of a corresponding or associated packaging processing machine such as including, but not necessarily limited to, cartoners, decasers, fillers, palletizers, depalletizers, case packers, shrink wrappers and the like, for example.

While in the foregoing specification this invention has been described in relation to certain preferred embodiments thereof, and many details have been set forth for purpose of illustration, it will be apparent to those skilled in the art that the subject invention is susceptible to additional embodiments and that certain of the details described herein can be varied considerably without departing from the basic principles of the invention.

The invention claimed is:

1. An apparatus for self-cleaning of a component in a machine, the apparatus comprising:

a gripper including a first gripper jaw with a first grip surface opposite a second gripper jaw with a second grip surface a first air nozzle in combination with the first grip surface;

a second air nozzle in combination with the second grip surface; and at least one air conduit connected at a first end to the first air nozzle and the second air nozzle, and configured to be in air flow communication with air exhaust from an air cylinder of the machine; wherein the air cylinder receives compressed air to actuate the gripper or a second component of the machine, and the air exhaust is waste air generated from reciprocating the gripper or the second component of the machine.

2. The apparatus of claim 1 wherein the air exhaust enters the at least one air conduit from the gripper or the second component of the machine at a second end of the at least one air conduit.

3. The apparatus of claim 1 comprising a valve or splitter disposed in the air flow communication between the air cylinder and the first and second air nozzles.

4. The apparatus of claim 1 wherein the machine from which the air exhaust is obtained comprises a packaging processing machine.

5. The apparatus of claim 1, wherein the first air nozzle extends into and/or through the first gripper jaw to discharge air out a first discharge opening in the first grip surface to be cleaned.

6. The apparatus of claim 5, wherein the second air nozzle extends into and/or through the second gripper jaw to discharge air out a second discharge opening in the second grip surface to be cleaned.

7. The apparatus of claim 1, wherein the first air nozzle extends into and/or routes the waste air through the first gripper jaw and the first grip surface.

8. The apparatus of claim 7, wherein the second air nozzle extends through and/or routes the waste air through the second gripper jaw and the second grip surface.

9. An apparatus for self-cleaning of a gripper including a first grip surface opposite a second grip surface, the apparatus comprising:

an air nozzle disposed in air discharge communication with the first grip surface, the air nozzle connected to a discharge opening in the first grip surface, and the air nozzle in air flow communication with air exhaust from an air cylinder component of the gripper, wherein the air cylinder receives compressed air to actuate the gripper, and the air exhaust is waste air generated from reciprocating the gripper.

10. The apparatus of claim 9 wherein the air nozzle extends into and/or through a gripper jaw including the first grip surface to discharge air out the discharge opening.

11. The apparatus of claim 10 further comprising a second air nozzle extends into and/or through a second gripper jaw including the second grip surface to discharge air out a second discharge opening in the second grip surface.

12. The apparatus of claim 9 wherein the first grip surface comprises a textured grip surface on a gripper jaw, and additionally comprising:

an air tube with a first end connected to the air nozzle through a side of the gripper jaw opposite the grip surface, and a second end connected to the air exhaust from the air cylinder of the gripper.

13. The apparatus of claim 9 wherein the gripper includes two gripper jaws, each with a corresponding air nozzle disposed therethrough in air discharge communication with a corresponding textured grip surface.

14. The apparatus of claim 13 additionally comprising:

an air tube connecting the air exhaust from the air cylinder component to the corresponding air nozzle of each of the two gripper jaws.

* * * * *